United States Patent
Bedeau et al.

(10) Patent No.: US 9,545,830 B2
(45) Date of Patent: Jan. 17, 2017

(54) SUSPENSION BEARING DEVICE, MOTOR VEHICLE EQUIPPED WITH SUCH A STRUT BEARING DEVICE AND MANUFACTURING METHOD

(71) Applicants: Charles Bedeau, Saint-Cyr-sur-Lorie (FR); Sylvain Bussit, Monnaie (FR); Francois De Lemps, Saint-Cyr-sur-Loire (FR); Christophe Houdayer, Semblancay (FR); Thomas Lepine, Villandry (FR); Jean-Marc Soudee, Chambray-les-Tours (FR); Desire Vidot, Ballan-Miré (FR)

(72) Inventors: Charles Bedeau, Saint-Cyr-sur-Lorie (FR); Sylvain Bussit, Monnaie (FR); Francois De Lemps, Saint-Cyr-sur-Loire (FR); Christophe Houdayer, Semblancay (FR); Thomas Lepine, Villandry (FR); Jean-Marc Soudee, Chambray-les-Tours (FR); Desire Vidot, Ballan-Miré (FR)

(73) Assignee: AKTIEBOLAGET SKF, Goteborg (SE)

( * ) Notice: Subject to any disclaimer, the term of this patent is extended or adjusted under 35 U.S.C. 154(b) by 0 days.

(21) Appl. No.: 14/867,015

(22) Filed: Sep. 28, 2015

(65) Prior Publication Data

US 2016/0089946 A1    Mar. 31, 2016

(30) Foreign Application Priority Data

Sep. 30, 2014  (EP) .................................... 14306536

(51) Int. Cl.
*B60G 15/06* (2006.01)
*F16C 33/76* (2006.01)
(Continued)

(52) U.S. Cl.
CPC ........... *B60G 15/063* (2013.01); *B60G 15/068* (2013.01); *F16C 19/10* (2013.01); *F16C 33/761* (2013.01);
(Continued)

(58) Field of Classification Search
CPC ..... F16C 19/10; F16C 33/761; F16C 33/7886; F16C 33/7889; F16C 33/80; F16C 35/07; F16C 2326/05; B60G 15/063; B60G 15/068; B60G 2202/312; B60G 2204/1242; B60G 2204/128; B60G 2204/418; B60G 2202/31
(Continued)

(56) References Cited

U.S. PATENT DOCUMENTS 4,690,425 A    9/1987  Kubo
4,948,272 A *  8/1990  Stowe .................. B60G 15/068
                                                    384/607
(Continued)

FOREIGN PATENT DOCUMENTS

DE    102012211457 A1 *  1/2014  .............. F16C 19/10
FR    2915929 A1    11/2008
(Continued)

*Primary Examiner* — Marcus Charles
(74) *Attorney, Agent, or Firm* — Bryan Peckijan; SKF USA Inc. Patent Dept.

(57) ABSTRACT

A suspension bearing device, comprising: a bearing, a lower cup and an upper cup centered on a central axis. The lower cup having a body including a tubular axial portion and an annular outward radial portion. The lower cup is provided with a damper pad including: an inner portion disposed against the annular outward radial portion of the body; an outer portion for bearing a suspension spring; and an annular recess for receiving a creep of material of the damper pad when the outer portion is constrained by the suspension spring. The suspension bearing device can be integrated into a motor vehicle. A method for manufacturing such a suspension bearing device.

15 Claims, 5 Drawing Sheets

(51) Int. Cl.
*F16C 33/78* (2006.01)
*F16C 19/10* (2006.01)

(52) U.S. Cl.
CPC ..... *F16C 33/7886* (2013.01); *B60G 2202/312* (2013.01); *B60G 2204/128* (2013.01); *B60G 2204/1242* (2013.01); *B60G 2204/418* (2013.01)

(58) Field of Classification Search
USPC ............... 384/477, 484, 590, 607, 609, 441; 267/220, 195; 280/124.147, 124.155
See application file for complete search history.

(56) References Cited

U.S. PATENT DOCUMENTS

| | | | | |
|---|---|---|---|---|
| 8,308,176 | B2* | 11/2012 | Lenon | B60G 15/068 267/220 |
| 2005/0247531 | A1* | 11/2005 | Oota | F16F 9/58 188/322.19 |
| 2008/0048370 | A1* | 2/2008 | Corlet | B60G 15/068 267/220 |
| 2008/0279494 | A1* | 11/2008 | Beauprez | F16C 19/10 384/513 |
| 2012/0146306 | A1* | 6/2012 | Dubus | B60G 15/068 280/124.155 |
| 2012/0257849 | A1* | 10/2012 | Corbett | B60G 15/067 384/607 |
| 2012/0292841 | A1* | 11/2012 | Corbett | B60G 15/068 267/217 |
| 2013/0195393 | A1* | 8/2013 | Corbett | B60G 15/067 384/622 |
| 2013/0277161 | A1* | 10/2013 | Bussit | B60G 13/003 188/321.11 |

FOREIGN PATENT DOCUMENTS

| | | | | |
|---|---|---|---|---|
| FR | WO 2009106469 A1 * | 9/2009 | ........... | B60G 15/068 |
| FR | WO 2010012766 A1 * | 2/2010 | ........... | B60G 15/068 |
| FR | 2989634 A1 | 10/2013 | | |
| GB | 2176571 A | 12/1986 | | |
| SE | FR 2949525 A1 * | 3/2011 | ........... | B60G 15/067 |
| WO | 2011-012484 A1 | 2/2011 | | |

* cited by examiner

SUSPENSION BEARING DEVICE, MOTOR VEHICLE EQUIPPED WITH SUCH A STRUT BEARING DEVICE AND MANUFACTURING METHOD

CROSS REFERENCE TO RELATED APPLICATION

This is a Non-Provisional Patent Application, filed under the Paris Convention, claiming the benefit of Europe (EP) Patent Application Number 14306536.5, filed on 30 Sep. 2014 (30 Sep. 2014), which is incorporated herein by reference in its entirety.

TECHNICAL FIELD OF THE INVENTION

The invention concerns a suspension bearing device, in particular of the MacPherson type ("MacPherson Suspension Bearing" or MSBU). The invention also concerns a motor vehicle equipped with such a suspension bearing device. The invention also concerns a method for manufacturing such a suspension bearing device. The field of the invention is that of suspension systems, particularly for motor vehicles.

BACKGROUND OF THE INVENTION

In a known manner, a suspension system comprises a strut supporting an axle and a wheel of a vehicle. A suspension bearing device is placed in the top portion of the strut, opposite to the wheel and the ground, between a suspension spring and an upper member secured to the body of the vehicle. The spring is placed around a damper piston rod of which the end may be secured to the body of the vehicle.

WO-A-2011/012484 discloses an example of a suspension bearing device, comprising a rolling bearing, a lower cup and an upper cup. The suspension bearing device is configured for transmitting loads between a suspension spring and the body of the vehicle, while allowing a relative angular movement between the races of the rolling bearing. The lower cup includes a metal stiffening insert to have a high enough rigidity and to allow the transmission of high axial and radial loads. The lower cup also includes a flexible member, comprising an annular ring and two seals connected to the annular ring by axial studs.

The seals are designed to protect the bearing against infiltrations of water or pollutant particles, while the annular ring is designed to absorb in part the vibrations and shocks generated by the suspension spring. However, inconvenient noise can be generated in case of important vibrations. In that case, the axial damping effect of the annular ring is not fully satisfactory due to its small thickness. Besides, the suspension spring can radially collide with the rigid body of the lower cup. Consequently, the car manufacturer usually arranges an additional damping component, namely a rubber insulator, between the suspension bearing device and the suspension spring.

SUMMARY OF THE INVENTION

The aim of the invention is to provide an improved suspension bearing device.

To this end, the invention concerns a suspension bearing, comprising a bearing, a lower cup and an upper cup centered on a central axis, the lower cup having a body including a tubular axial portion and an annular outward radial portion, characterized in that the lower cup is provided with a damper pad including: an inner portion disposed against the annular outward radial portion of the body; an outer portion for bearing a suspension spring; and an annular recess for receiving a creep of material of the damper pad when the outer portion is constrained by the suspension spring.

Thanks to the invention, the behavior of the suspension bearing device is improved under important vibrations. The damper pad absorbs the vibrations generated by the suspension ring more efficiently than a thin plane ring. The recess gives more flexibility to the damper pad. The overall performance of the suspension bearing device is improved, with a better load repartition. Moreover, the invention avoids using an additional damping component, which reduces the assembly costs for the car manufacturer.

According to further aspects of the invention which are advantageous but not compulsory, the suspension bearing device may incorporate one or several of the following features:

- The damper pad has a maximal thickness, defined parallel to the central axis, which is superior to 5 millimeters, by example equal to 8 millimeters.
- The damper pad has a maximal thickness, defined parallel to the central axis, which is superior to a maximal thickness of the tubular axial portion, defined perpendicular to the central axis.
- The annular recess is located closer to the tubular axial portion than to the annular outward radial portion of the body.
- The damper pad includes a tubular axial portion extending along the tubular axial portion of the lower cup, to avoid contact of the suspension spring with the tubular axial portion of the body.
- The annular recess is located beside the tubular axial portion.
- The inner portion of the damper pad has a curved convex shape.
- The outer portion of the damper pad has a convex shape, preferably including two different slopes.
- The lower cup is provided with at least one seal disposed in sealing contact with the upper cup.
- The seal is formed integral with the damper pad.
- The seal is separated from the damper pad.
- The seal and the damper pad are made of two different materials and are manufactured in contact with each other.
- The lower cup is provided with two seals in sealing contact with the upper pad.

The invention also concerns a motor vehicle, equipped with a suspension bearing device as mentioned here-above.

The invention also concerns a method for manufacturing a suspension bearing device as mentioned here-above. The method includes at least the following steps:
  a) a step of molding the damper pad; and
  b) a step of assembling the lower cup with the bearing and the upper cup to form the suspension bearing device.

According to further aspects of the invention which are advantageous but not compulsory, the manufacturing method may incorporate one or several of the following features:

- The damper pad is overmolded onto the body of the lower cup.
- The damper pad is vulcanized on the body of the lower cup.
- The damper pad is molded on the body of the lower cup by bi-injection, together with at least one seal provided on the lower cup.
- The seal and the damper pad are made of a same material.

The seal and the damper pad are made of two different materials.

BRIEF DESCRIPTION OF THE DRAWINGS

The invention will now be explained in correspondence with the annexed figures, and as an illustrative example, without restricting the object of the invention. In the annexed figures.

DETAILED DESCRIPTION OF SOME EMBODIMENTS

Figure 1:
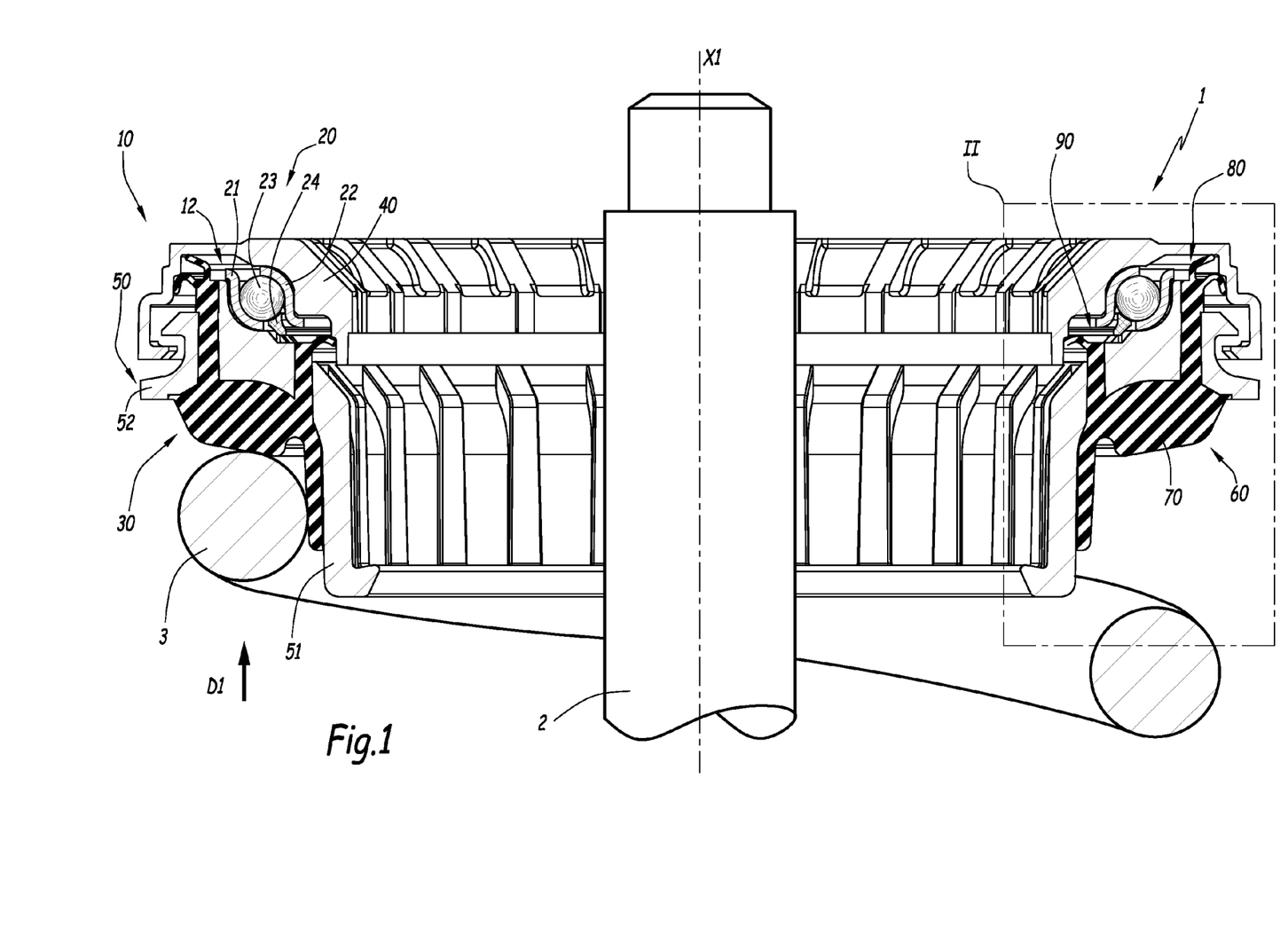
FIG. 1 is a sectional view of a suspension bearing device according to the invention, comprising a bearing, a lower cup and an upper cup.
Figure 2:
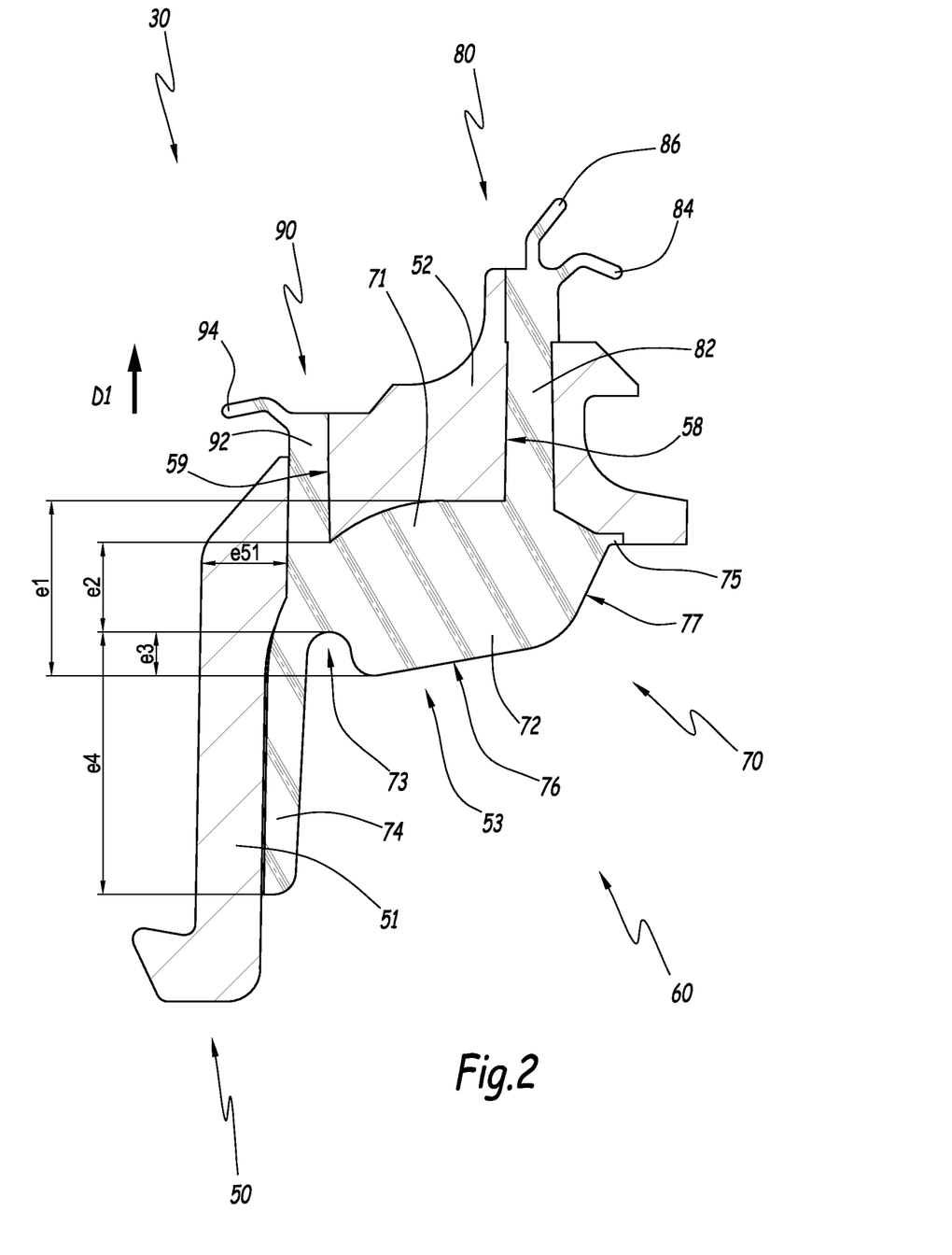
FIG. 2 is a view at a larger scale of detail II on FIG. 1, showing only the lower cup.

FIGS. 1 and 2 show a suspension bearing device 10 according to the invention and its constitutive elements. Device 10 is configured to equip a strut 1, partially shown on FIG. 1, of a motor-vehicle suspension system.

Strut 1 supports an axle and a wheel of a vehicle, not shown for simplification purposes. Strut 1 extends along a central axis X1 placed in a substantially vertical direction when the wheel of the vehicle rests on a flat ground. Strut 1 comprises a damper rod 2, a suspension spring 3 and the suspension bearing device 10. Rod 2 and spring 3 are partially and schematically shown on FIG. 1. Strut 1 also comprises a piston body and a bumper, not shown for simplification purposes. Damper rod 2 and piston body constitute a damper piston belonging to strut 1.

Device 10 has an overall a shape of revolution about axis X1. Device 10 comprises a rolling bearing 20, a lower cup 30 and an upper cup 40. Bearing 20 is positioned in a chamber 12 delimited between cups 30 and 40. Device 10 forms a compact assembly, which is practical to handle.

Bearing 20 is an angled-contact rolling bearing. Bearing 20 includes a bottom and outer race 21, a top and inner race 22, rolling elements 23 and a cage 24. Rolling elements 23 are balls placed in cage 24, in angled contact between the outer race 21 and the inner race 22. As an alternative example, rolling elements 23 may be rollers. Races 21 and 22 are preferably made of metal and formed by stamping. In this case, each of the races 21 and 22 forms a raceway for the rolling elements 23 within bearing 20. Bearing 20 forms an axial stop within device 10, between cups 30 and 40. Thus, device 10 forms an axial stop within strut 1. Bearing 20 allows, on the one hand, a relative pivoting between races 21 and 22 about the axis X1 and, on the other hand, an inclination of rod 2 relative to the body of the vehicle.

Lower cup 30 forms bearing means for suspension spring 3. Lower cup 30 comprises a body 50 and a flexible member 60, which are centered on axis X1. Lower cup 30 forms a two-part assembly devoid of stiffening inserts. Alternatively, body 50 of lower cup 30 may include one or several stiffening inserts.

Body 50 comprises a tubular axial portion 51 and an annular outward radial portion 52. Portion 52 extends from portion 51 opposite axis X1. Spring 3 is received in a rounded corner 53, formed between axial portion 51 and radial portion 52. Portion 51 forms a guide for spring 3, both axially and radially, while portion 52 forms an axial support for spring 3, with pad 70 interposed between body 50 and spring 3. Several axial channels 58 and 59 are formed through portion 52, each in a direction D1 parallel to axis X1. Those channels 58 and 59 are distributed around axis X1, such that a same radial plane includes both an external channel 58 and an internal channel 59 on each side of axis X1, as shown on FIGS. 1 and 2. Body 50 is made of a metallic material or a rigid plastic material, for example polyamide PA66 reinforced with 30 or 50% glass fiber.

Flexible member 60 comprises a damper pad 70 and two seals 80 and 90, which are made in a same molding operation and of a same material. Preferably, flexible member 60 is overmolded onto body 50 of lower cup 30. Alternately, flexible member 60 can be vulcanized on body 50. Member 60 is made of a flexible material, for example an elastomer such as rubber, polyurethane or thermoplastic elastomer.

Pad 70 includes an inner portion 71, an outer portion 72, an annular recess 73, a tubular axial portion 74 and a small annular outward radial portion 75. Portion 71 is located at the inner upper side of pad 70 and is disposed against the annular outward radial portion 52 of body 50. More precisely, portion 71 is tightly fastened to portion 52, so that pad 70 is fastened to body 50. Portion 71 has a curved convex shape. Portion 72 is located at the outer bottom side of pad 70, opposite portion 71, for receiving spring 3 in bearing contact. Portion 72 has a convex shape, including two different slopes 76 and 77. Pad 70 has a cambered shape delimited by portion 71 and 72, allowing a more efficient absorption of vibrations than a thin plane ring. Recess 73 is an annular groove formed in portion 72, beside portion 74. Recess 73 is opened on the outside of portion 72. Recess 73 is designed for receiving a creep of material of pad 70 when portion 72 is constrained by spring 3. Thus, recess 73 further improves the flexibility of pad 70. Recess 73 is located closer to portion 51 than to portion 52, to guide the creep toward portion 51. Portion 74 extends from portion 72 along the tubular axial portion 51 of body 50. In other words, portion 74 is an extension of pad 70 interposed between portion 51 and spring 3. Thus, portion 74 allows avoiding contact of spring 3 with portion 51. Portion 75 is a small overflow obtained when molding pad 70.

Pad 70 has different measurements defined in a direction D1 parallel to axis X1, as shown on FIG. 2. Pad 70 has a maximal projected thickness e1 defined along direction D1 between the upper point of portion 71 and the lower point of portion 72. Preferably, thickness e1 is superior to 5 millimeters, by example equal to 8 millimeters. Besides, thickness e1 is superior to a maximal thickness e51 of portion 51, defined perpendicular to axis X1. Pad 70 has a minimal local thickness e2 defined along direction D1 between the bottom of recess 73 and the edge of portion 52. Recess 73 has a depth e3, which is preferably comprised between 20 and 40% of thickness e1. Portion 74 has a length e4 defined along direction D1 between its edge and the bottom of recess 73. Length e4 is superior to thickness e1.

Seals 80 and 90 are designed to protect chamber 12 and bearing 20 against infiltrations of water or pollutant particles. Seal 80 is arranged on the outer side of chamber 12, while seal 90 is arranged on the inner side of chamber 12. Seal 80 comprises several stubs 82 connected to portion 71 of pad 70 through channels 58, while seal 90 comprises several stubs 92 connected to portion 71 of pad 70 through channels 59. Stubs 82 and 92 are distributed around axis X1, as channels 58 and 59. Seal 80 comprises two sealing lips 84 and 86, while seal 90 comprises one sealing lip 94, disposed in contact with inner sealing surfaces of upper cup 40.

Spring 3 is wound around rod 2 and axis X1. Spring 3 is placed so as to rest between device 10 on the top side and the body of the damper piston on the bottom side. More precisely, spring 3 is positioned in the rounded corner 53 of lower cup 30, in bearing contact with portions 72 and 74 of pad 70. Spring 3 is elastically deformable according to the stresses exerted on the suspension system of the vehicle. When the suspension system is in service, spring 3 exerts upward axial forces against pad 70, which transmits these forces to lower cup 30, which transmits these forces within device 10.

Thanks to the invention, the contact area between spring 3 and damper pad 70 is increased in comparison with known prior art devices. Portions 72 and 74 are designed for bearing spring 3, respectively axially and radially. The vibrations absorption, noise reduction and load repartition between spring 3 and device 10 are improved.

Figure 3:
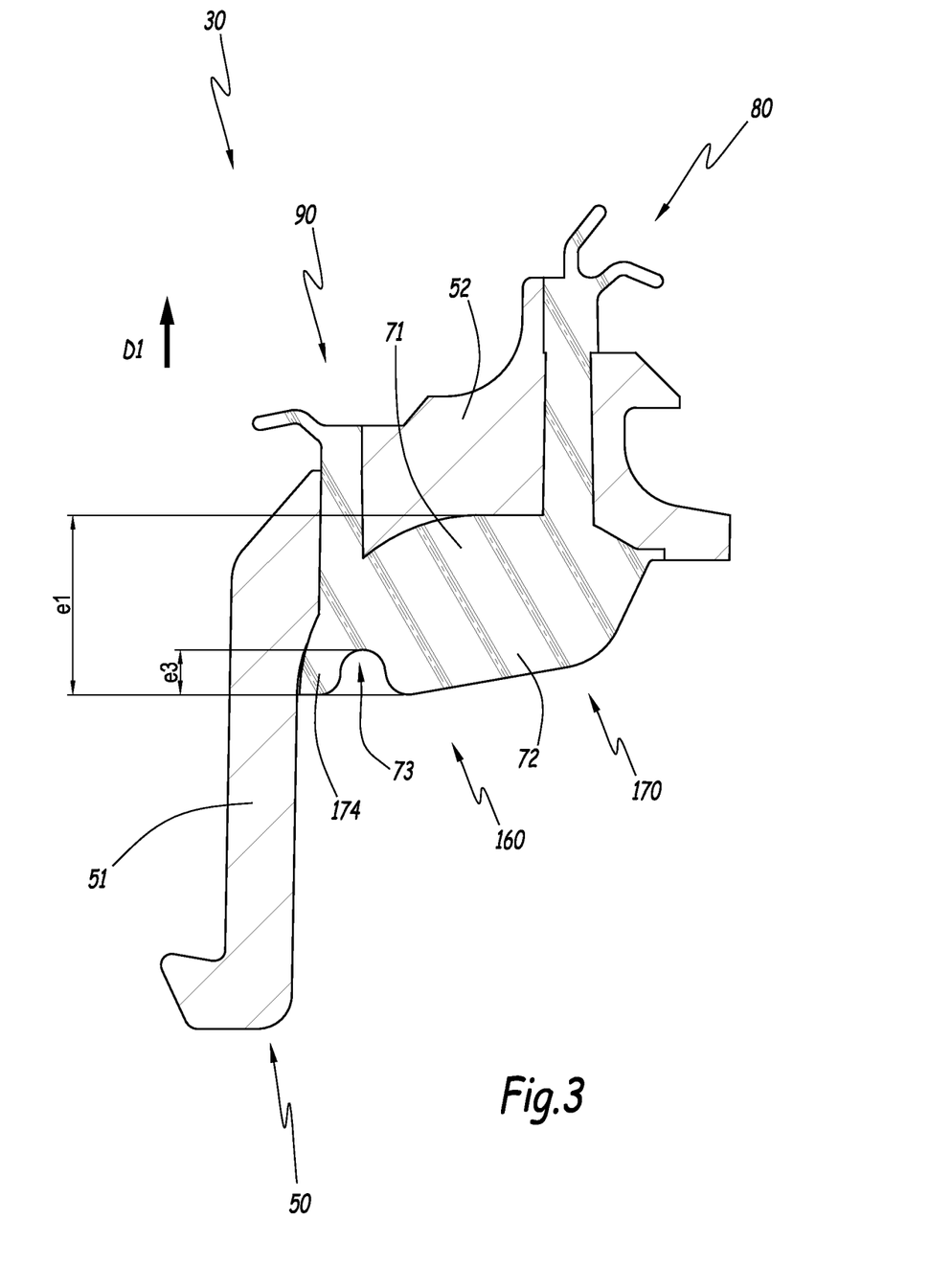
FIGS. 3, 4 and 5 are views similar to FIG. 2, showing respectively a second, a third and a fourth embodiment of a lower cup for a suspension bearing device according to of the invention.
Figure 4:
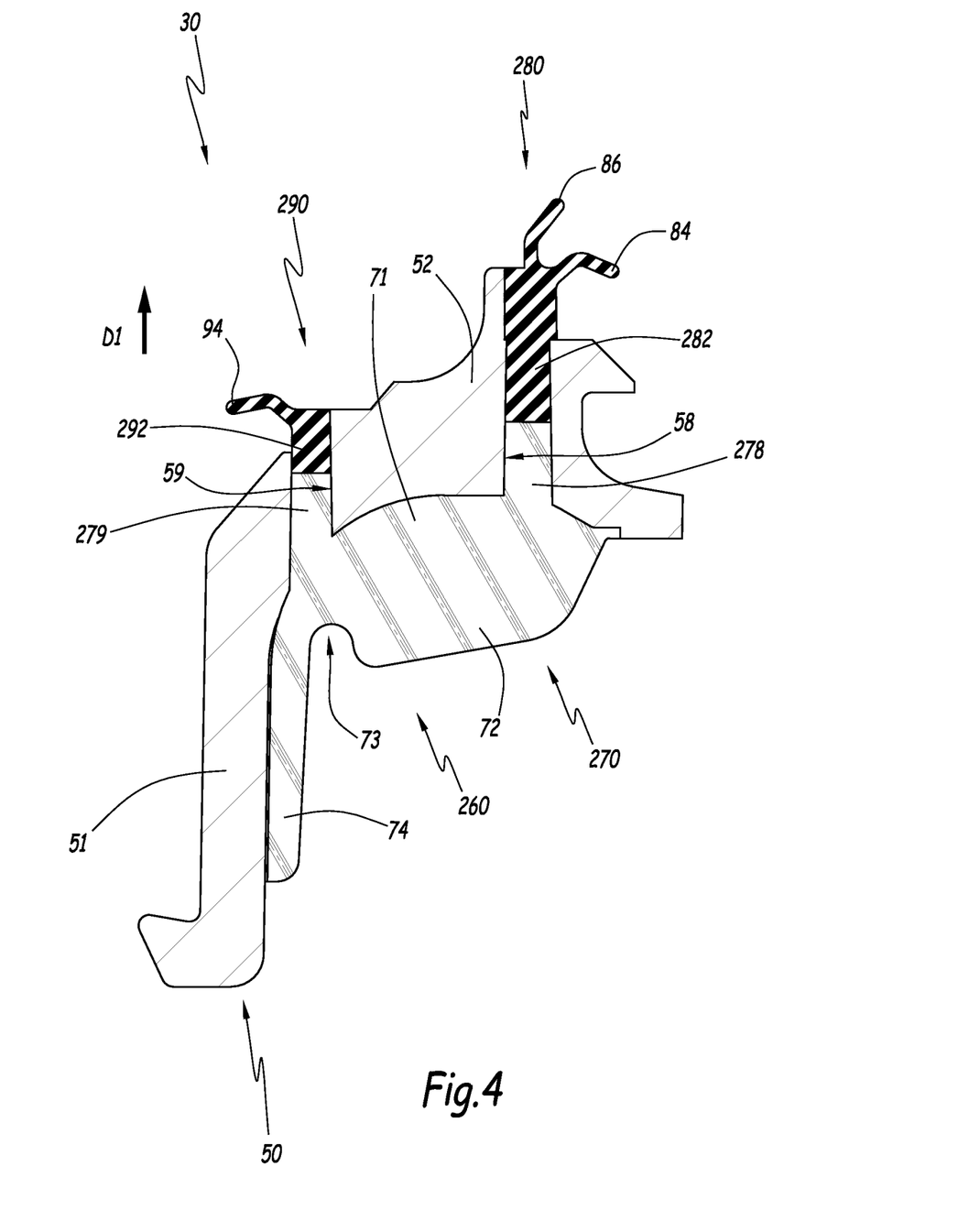
Figure 5:
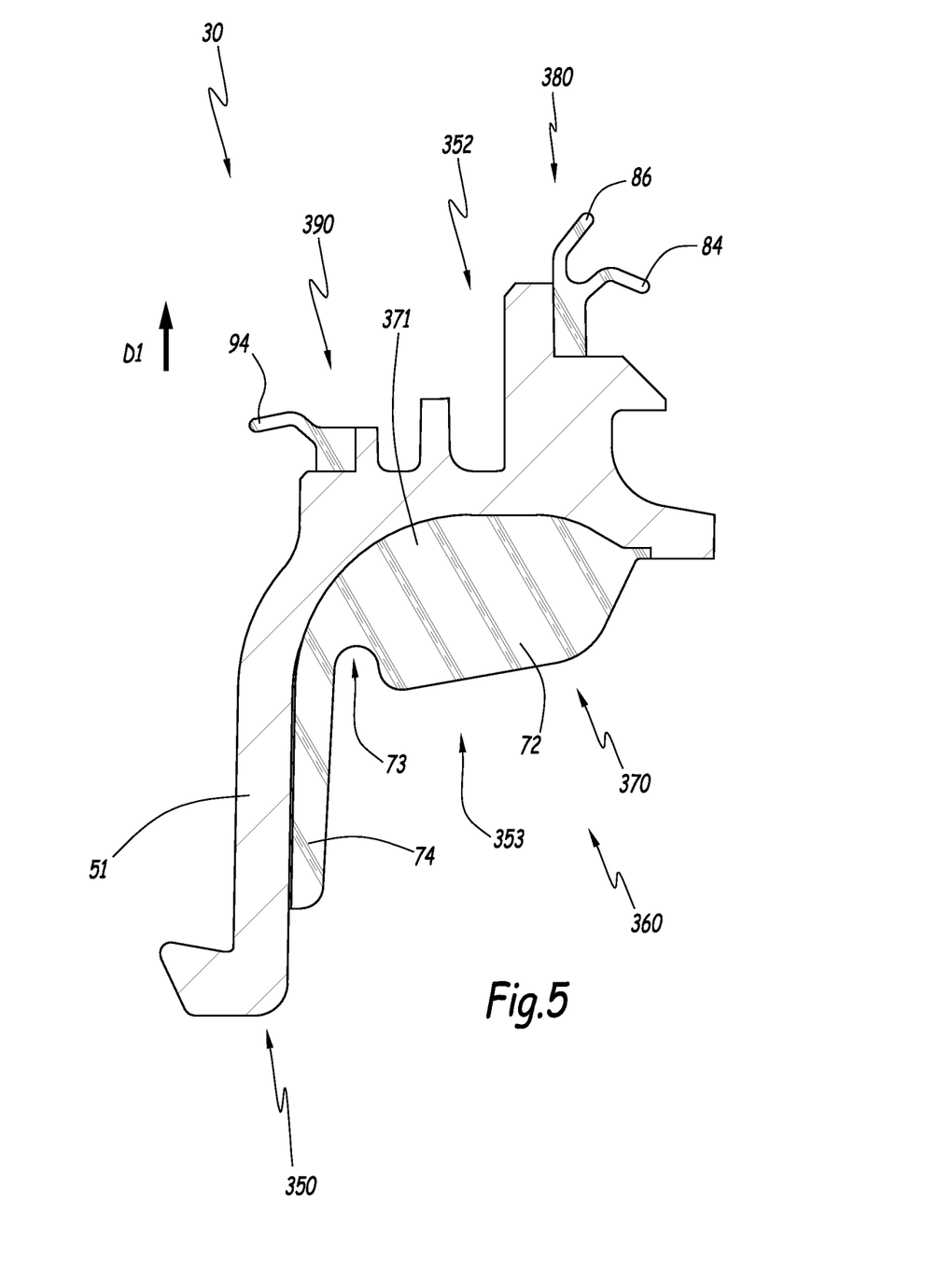

FIGS. 3 to 5 show other embodiments of a lower cup 30, for a suspension bearing device 10 according to the invention. In these embodiments, elements similar to the first embodiment have the same references and work in the same way. Only the differences with respect to the first embodiment are described hereafter.

FIG. 3 shows a flexible member 160, having a pad 170 devoid of tubular axial portion 74. Pad 170 has a small inner bead 174, which is part of portion 72. Pad 170 is designed for bearing spring axially, but not radially. On the other hand, pad 170 is simpler and cheaper than pad 70.

FIG. 4 shows a pad 270 separated from seals 280 and 290. Pad 270 is made of a first material, preferably a first elastomer having a good resistance to compression stresses and automotive fluids. Seals 280 and 290 are made of a second material, preferably a second elastomer having a good friction coefficient. Alternately, seals 280 and 290 can be made of a second and a third material. Thus, pad 260 can be optimized to absorb the vibrations generated by spring 3, while seals 280 and 290 can be optimized to protect bearing 20 against infiltrations of water or pollutant particles. In other words, elements 260, 280 and 290 can be optimized for their respective functions, i.e. damping or sealing. Flexible member 260 includes pad 270 and stubs 278 and 279, extending toward portion 71 through channels 58 and 59. Pad 270 and seals 280 and 290 are preferably manufactured by bi-injection molding, such that each stub 278 is in contact with a stub 282 of seal 280 and each stub 279 is in contact with a stub 292 of seal 290 inside portion 52 of body 50. In other words, pad 270 and seals 280 and 290 are made of at least two different materials and are manufactured in contact with each other.

FIG. 5 shows a body 350, together with another pad 370 separated from seals 380 and 390. Body 350 has a portion 352 which is not provided with axial channels 58 and 59. Flexible member 360 located in a rounded corner 353 comprises only pad 370, having an inner portion 371 not connected to seals 380 and 390. Pad 360 on the one hand, seals 380 and 390 on the other hand, can be made of a same material or of different material. Preferably, those elements 360, 380 and 390 are made of different materials and optimized for their respective functions, i.e. damping or sealing.

Other non-shown embodiments can be implemented within the scope of the invention. By example, elements 20, 30 or 40 may have different configurations. According to another example, device 10 may comprise several bearings 20 located between cups 30 and 40.

Whatever the embodiment, lower cup 30 is provided with a damper pad including an annular recess 73, designed for receiving a creep of material of the damper pad when the outer portion 72 is constrained by the suspension spring 3.

In addition, technical features of the different embodiments can be, in whole or part, combined with each other. Thus, the suspension bearing device 10 can be adapted to the specific requirements of the application.

What is claimed is:

1. A suspension bearing device, comprising:
  a bearing;
  a lower cup; and
  an upper cup centered on a central axis, the central axis being parallel to an axial direction of the suspension bearing device,
  the lower cup having a body including a tubular axial portion and an annular outward radial portion,
  wherein the lower cup is provided with a damper pad comprising:
    an inner portion disposed against the annular outward radial portion of the body;
    an outer portion configured to bear against a suspension spring such that the outer portion and the inner portion are configured to be interposed axially between the suspension spring and the annular outward radial portion of the body of the lower cup; and
    an annular recess on the outer portion for receiving a creep of material of the damper pad when the outer portion is constrained by the suspension spring, wherein a distance defined along the central axis between an upper point of the inner portion and a lower point of the outer portion is greater than a distance between the upper point of the inner portion and a bottom of the annular recess, and the annular recess being radially spaced from the tubular axial portion of the lower cup,
  wherein the damper pad has a cambered shape delimited by the inner portion and the outer portion, wherein the inner portion has a first convex shape, and the outer portion having a second convex shape.

2. The suspension bearing device according to claim 1, wherein the damper pad has a maximal thickness, defined parallel to the central axis, which is superior to 5 millimeters.

3. The suspension bearing device according to claim 1, wherein the damper pad has a maximal thickness, defined parallel to the central axis, which is equal to 8 millimeters.

4. The suspension bearing device according to claim 1, wherein the damper pad has a maximal thickness, defined parallel to the central axis, which is superior to a maximal thickness of the tubular axial portion, defined perpendicular to the central axis.

5. The suspension bearing device according to claim 1, wherein the annular recess is located closer to the tubular axial portion than to the annular outward radial portion of the body.

6. The suspension bearing device according to claim 1, the damper pad further includes a damper pad tubular axial portion extending along the tubular axial portion, to avoid contact of the suspension spring with the tubular axial portion of the body.

7. The suspension bearing device according to claim 6, wherein the annular recess is located beside the damper pad tubular axial portion.

8. The suspension bearing device according to claim 1, wherein the outer portion of the damper pad has a convex shape, including two different slopes.

9. The suspension bearing device according to claim 1, wherein the lower cup is provided with at least one seal disposed in sealing contact with the upper cup.

10. The suspension bearing device according to claim 9, wherein the at least one seal is formed integral with the damper pad.

11. The suspension bearing device according to claim 9, wherein the at least one seal is separated from the damper pad.

12. The suspension bearing device according to claim 9, wherein the at least one seal and the damper pad are made of two different materials and are manufactured in contact with each other.

13. The suspension bearing device according to claim 1, wherein the lower cup is provided with two seals in sealing contact with the upper cup.

14. A motor vehicle, equipped with a suspension bearing device, the suspension bearing device comprising:
  a bearing;
  a lower cup; and
  an upper cup centered on a central axis, the central axis being parallel to an axial direction of the suspension bearing device,
  the lower cup having a body including a tubular axial portion and an annular outward radial portion,
  wherein the lower cup is provided with a damper pad comprising:
    an inner portion disposed against the annular outward radial portion of the body;
    an outer portion configured to bear against a suspension spring such that the outer portion and the inner portion are configured to be interposed axially between the suspension spring and the annular outward radial portion of the body of the lower cup;
    an annular recess on the outer portion for receiving a creep of material of the damper pad when the outer portion is constrained by the suspension spring, wherein a distance defined along the central axis between an upper point of the inner portion and a lower point of the outer portion is greater than a distance between the upper point of the inner portion and a bottom of the annular recess, and the annular recess being radially spaced from the tubular axial portion of the lower cup;
  wherein the damper pad has a cambered shape delimited by the inner portion and the outer portion, wherein the inner portion has a first convex shape, and the outer portion having a second convex shape;
  wherein the suspension bearing device is integrated into the motor vehicle.

15. A method for manufacturing a suspension bearing device, the suspension bearing device comprising:
  a bearing;
  a lower cup; and
  an upper cup centered on a central axis, the central axis being parallel to an axial direction of the suspension bearing device,
  the lower cup having a body including a tubular axial portion and an annular outward radial portion,
  wherein the lower cup is provided with a damper pad comprising:
    an inner portion disposed against the annular outward radial portion of the body;
    an outer portion configured to bear against a suspension spring such that the outer portion and the inner portion are configured to be interposed axially between the suspension spring and the annular outward radial portion of the body of the lower cup;
    an annular recess on the outer portion for receiving a creep of material of the damper pad when the outer portion is constrained by the suspension spring, wherein a distance defined along the central axis between an upper point of the inner portion and a lower point of the outer portion is greater than a distance between the upper point of the inner portion and a bottom of the annular recess, and the annular recess being radially spaced from the tubular axial portion of the lower cup;
  wherein the damper pad has a cambered shape delimited by the inner portion and the outer portion, wherein the inner portion has a first convex shape, and the outer portion having a second convex shape;
  the method comprising steps of:
    molding the damper pad; and
    assembling the lower cup with the bearing and the upper cup to form the suspension bearing device.

* * * * *